Aug. 15, 1933.  L. H. MORSE ET AL  1,923,025
PORTABLE LOCK
Filed June 13, 1931
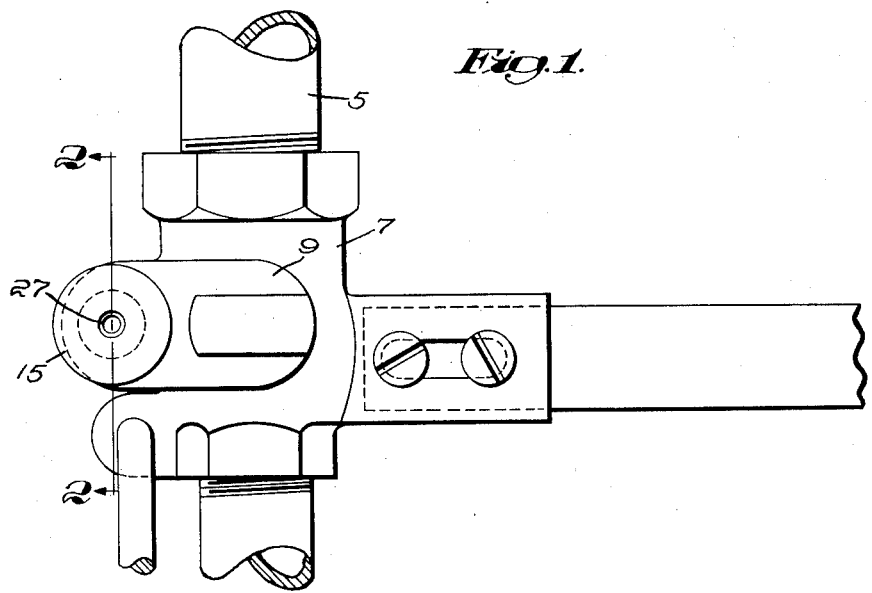
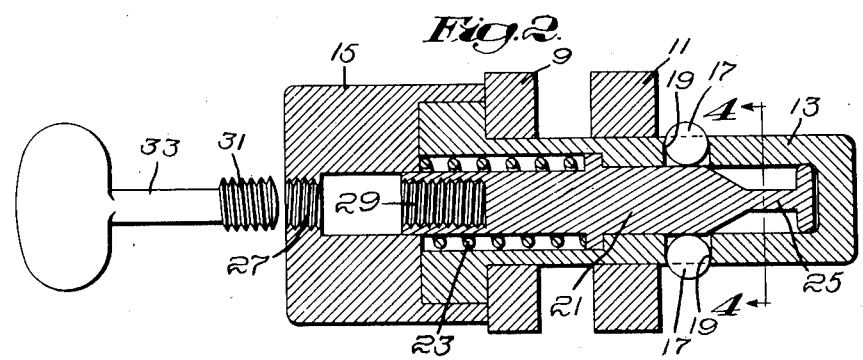
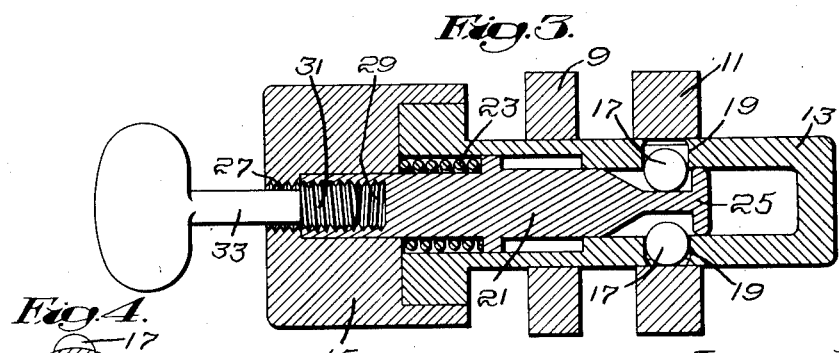
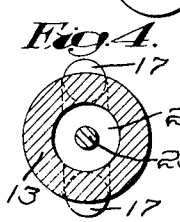
Inventors:
Thomas F. Smith
Lynn H. Morse Patented Aug. 15, 1933

1,923,025

UNITED STATES PATENT OFFICE 1,923,025

PORTABLE LOCK

Lynn H. Morse, Natick, and Thomas F. Smith, Quincy, Mass., assignors to Ernest L. Chase, Dorchester, Mass., as trustee Application June 13, 1931, Serial No. 544,162

8 Claims. (Cl. 70—124)

This invention relates to portable locks and the object is to provide a simple, strong and efficient lock of this character.

The general field of application of the lock is to those uses for which a padlock is commonly used. A particular application of the invention is to locking the handles of supply valves in service pipes of gas companies or other public service companies to prevent unauthorized use of their commodities. For this purpose a cheap, simple and compact construction is required and one which will baffle the efforts of the ordinary person to pick or break the same.

Our invention will be well understood by reference to the following description of an illustrative embodiment thereof shown as applied to the supply valve of a domestic gas meter. In the drawing:—

Fig. 1 is an elevation of the supply valve, parts of the piping with which it is associated being shown broken away and with a lock illustrative of our invention applied;

Fig. 2 is a section on the line 2—2 of Fig. 1 on an enlarged scale and also shows a key for operating the lock;

Fig. 3 is a similar view showing the lock being withdrawn; and

Fig. 4 is a section on the line 4—4 of Fig. 2.

Referring to Fig. 1, we have there shown a gas supply pipe 5 having therein a turn-cock valve 7, the plug of which may be turned by the handle 9 which has an opening adapted to align in the shut-off position shown with a similar opening on an extension or eye 11 projecting from the casing of the valve. A locking member inserted through these openings prevents opening of the valve.

The lock here shown (see Fig. 2) embodies a hollow cylindrical shank 13 preferably in the form of a cup integrally closed at one end and having an enlarged head 15 fixedly secured at the other end. This nail-like member may be inserted through the aligned eyes in the members 9 and 11, the shank passing therethrough from the forward side thereof until the head 15 rests against the forward side of the member 9. Preferably the shank 13 fits the eyes in the members to be locked fairly closely as indicated.

To cooperate with the head 15 to retain the shank 13 in locking position, we provide the bolts 17, preferably as shown in the form of balls, adapted to extend laterally from the shank 13 to underlie the further margin of the opening in the part 11 so that the two apertured members 9 and 11 will be received between the enlarged head 15 and the projected balls 17. Herein the balls are received in radial openings 19 in the shank, the external portions of these openings being reduced in diameter to keep the balls from dropping out.

Suitable means housed within the hollow shank 13 provide for maintaining the balls in projected position and for releasing them for retraction. We have herein shown an axially sliding plunger 21 normally pressed rearwardly by spring 23 and in this normal position shown in Fig. 2 having a portion of relatively great diameter opposed to the balls to hold them in the projected position shown. The rear of the plunger is reduced at 25 so that when drawn forward (to the left in the figures) to the position of Fig. 2, the balls are released for repression to permit the lock to be drawn out of the eyes in the members 9 and 11, as shown in Fig. 2.

Herein a substantially axial opening 27 in the head 15 provides for the introduction of a suitable key into tractile engagement with the plunger 23 to permit it to be drawn forward. Herein the end of the plunger is provided with a threaded socket 29 adapted to receive the enlarged threaded end 31 of the key which has a reduced shank 33 adapted to turn freely within the key-hole 27 so that the threaded end 31 may be screwed up into socket 29. When so engaged the plunger may be drawn forwardly to the left in the figures, as indicated in Fig. 3, and by this same movement the shank 13 may be drawn out from the eyes in members 9 and 11, the balls being released for repression, as indicated in Fig. 2.

The key-hole 27 may be suitably shaped to prevent operation of the lock by an instrument other than the proper key. Herein to prevent the use of a threaded rod such as an ordinary machine screw, the interior surface of the key-hole is threaded to correspond with the threads in 29. It will be seen that if an ordinary screw is inserted, its threads engaging both the threads in 27 and 29 will lock the plunger in position and prevent its being drawn forward. There is a further advantage that the ordinary person unacquainted with the internal mechanism of the lock, observing the threads about the key-hole, is likely to conclude that the operation of the lock depends upon the engagement of the key with these threads. If acting on this conclusion, he will effectually bar himself from releasing the lock.

As seen from Fig. 2, any rearward push on the plunger such as might be exerted by means of a wire or the like introduced in the key-hole is ineffective to release the lock. It will also be noted (see Fig. 4) that the plunger 29 may be turned indefinitely without harm and in the embodiment shown without releasing the lock. Since most locks operate by turning movement, this tends to baffle the amateur picker, and it also has the advantage that the authorized user runs no danger of twisting off and breaking a key after the threaded end 31 bottoms in the socket 29.

It will be seen that the lock is small, yet strong and substantial. It has been found that in many cases tenants do not scruple to destroy a padlock in order to obtain a little free gas. Padlocks may be easily broken or the bow sawed or filed through. The present lock is substantial, yet small, not easily accessible for working on it and presents no weak points inviting attack with tools. It will be noticed that if a wrench is applied the lock may turn freely within the eyes in which it is inserted without any tendency to release or break. The body is not convenient to get at and, although small, is of a substantial nature. When balls 17 are used as bolts, their projecting portions present no convenient surface to be attacked by a hack-saw, and if a file is applied they tend to roll freely rather than be cut.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

What is claimed is:

1. A portable lock for securing together two members by being entered through registering apertures therein comprising a hollow shank arranged to be passed through said apertures from one side thereof and having an enlarged head to overlie the margin of the nearer aperture, a bolt extending from said shank to be engaged behind the further margin of an aperture, a spring-pressed plunger in said shank normally projecting said bolt, said head having an opening for the insertion of a key and said plunger having means with which a key inserted through said opening may make tractile engagement therewith.

2. A portable lock for securing together two members by being entered through registering apertures therein comprising a hollow shank arranged to be passed through said apertures from one side thereof and having an enlarged head to overlie the margin of the nearer aperture, a bolt extending from said shank to be engaged behind the further margin of an aperture, a spring-pressed plunger in said shank normally projecting said bolt, said plunger having a threaded socket into which a key having a threaded end may be screwed, said head having an opening for the insertion of such key, the interior margin of which is formed to preclude use as a key of a threaded rod such as an ordinary machine screw.

3. A portable lock for securing togther two members by being entered through registering apertures therein comprising a hollow shank arranged to be passed through said apertures from one side thereof and having an enlarged head to overlie the margin of the nearer aperture, said shank having a lateral opening with restricted mouth, a ball adapted to project therethrough to provide a bolt engaged behind the further margin of an aperture, a plunger working in said shank having a relatively large and a relatively reduced portion which when opposed to said ball respectively provide for the projection or repression thereof, a spring normally pressing said plunger rearwardly to oppose the large portion to said ball, the forward end of said plunger having means providing for tractile engagement of a key therewith, there being an opening through said head for introducing the key.

4. A portable lock for securing together two members by being entered through registering apertures therein comprising a hollow shank arranged to be passed through said apertures from one side thereof and having an enlarged head to overlie the margin of the nearer aperture, a bolt projecting through the wall of said shank to engage behind the further margin of an aperture, a spring-pressed plunger in said shank normally projecting the bolt and having a reduced portion presented to the bolt when said plunger is drawn forward against the spring to permit repression of the bolt, said plunger being capable of indefinitely continued rotative movement, the forward end of said plunger having a threaded socket into which may be screwed the threaded end of a key introduced through said head.

5. A portable lock for securing together two members by being entered through registering apertures therein comprising a hollow shank arranged to be passed through said apertures from one side thereof and having an enlarged head to overlie the margin of the nearer aperture, a bolt projecting through the wall of said shank to engage behind the further margin of an aperture, a movable member within the shank having a relatively large portion and a relatively reduced portion adapted when opposed to the bolt respectively to support the same in projected position or permit repression of the same, their being an opening in said head providing for introduction of a key into direct engagement with said movable member for shifting the same, the positions of said large and reduced portions being such that rearward pressure on said member by an instrument introduced through the opening is ineffective to release the bolt.

6. A separable portable lock for securing against relative movement two rigid members having aligning eyes comprising a member having an enlarged head and a cylindrical shank to pass through said eyes, a bolt extending laterally from said shank to be projected behind the further margin of an eye to receive the eye between the same and said head, mechanism housed in said shank for providing the projection and repression of said bolt, there being a substantially axial opening through said head for the introduction of a key to operate said mechanism, the mechanism being so arranged that rearward pressure thereon by a member introduced through said opening is ineffective to release the bolt.

7. A portable lock for securing against relative movement two rigid members having aligning eyes comprising a member having an enlarged head and a cylindrical shank to pass through said eyes, a bolt extending laterally from said shank to be projected behind the further margin of an eye to receive the eye between the same and the head, a substantially axially moving plunger normally projecting the bolt and on retraction of the same toward said head providing for repression thereof, there being a substantially axial opening through said head for the introduction of a key into tractile engagement with said plunger.

8. A lock comprising a casing, a bolt, a member normally holding the bolt projected, said member being retractible to provide for repression of the bolt, said member having a threaded opening extending in the direction of retracting movement to receive a threaded retracting key whereby it may be operated by axial draft on the key, the casing having a correspondingly threaded opening through which such key may be inserted to be engaged with said member.

THOMAS F. SMITH.
LYNN H. MORSE.